(12) United States Patent
Shinoda et al.

(10) Patent No.: US 12,085,538 B2
(45) Date of Patent: Sep. 10, 2024

(54) ULTRASONIC PHASED ARRAY DETECTION DEVICE FOR FLAW DETECTION OF PARALLEL TUBES

(71) Applicant: HITACHI ZOSEN CORPORATION, Osaka (JP)

(72) Inventors: Kaoru Shinoda, Osaka (JP); Masamitsu Abe, Osaka (JP); Joichi Murakami, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 321 days.

(21) Appl. No.: 17/614,465

(22) PCT Filed: Dec. 10, 2019

(86) PCT No.: PCT/JP2019/048308
§ 371 (c)(1),
(2) Date: Nov. 26, 2021

(87) PCT Pub. No.: WO2020/240896
PCT Pub. Date: Dec. 3, 2020

(65) Prior Publication Data
US 2022/0236233 A1 Jul. 28, 2022

(30) Foreign Application Priority Data
May 29, 2019 (JP) .................. 2019-099852

(51) Int. Cl.
*G01N 29/265* (2006.01)
*G01N 29/04* (2006.01)
*G01N 29/44* (2006.01)

(52) U.S. Cl.
CPC ........... *G01N 29/265* (2013.01); *G01N 29/04* (2013.01); *G01N 29/4418* (2013.01)

(58) Field of Classification Search
CPC .. G01N 29/265; G01N 29/04; G01N 29/4418; G01N 29/041; G01N 29/34; G01N 2203/0658
See application file for complete search history.

(56) References Cited

U.S. PATENT DOCUMENTS

2009/0193899 A1    8/2009   Panetta et al.

FOREIGN PATENT DOCUMENTS

| CN | 202533416 U | 11/2012 |
| JP | 56-131452 U | 10/1981 |

(Continued)

OTHER PUBLICATIONS

International Search Report dated Feb. 10, 2020, issued in corresponding International Patent Application No. PCT/JP2019/048308 with English translation (4 pgs.).

(Continued)

*Primary Examiner* — Jennifer Bahls
*Assistant Examiner* — Quang X Nguyen
(74) *Attorney, Agent, or Firm* — Pillsbury Winthrop Shaw Pittman, LLP

(57) ABSTRACT

An ultrasonic phased array detection device sequentially performing flaw detection testing on a welded joint of tubes arranged in a row. The ultrasonic phased array detection device includes: a flaw detection testing unit inserted into a target tube targeted for flaw detection testing among the tubes, and performing flaw detection testing on the welded joint of the target tube; a drive mechanism rotating the flaw detection testing unit around an axis of the target tube; and a jig to be inserted and fixed in a tube different from the target tube. The flaw detection testing unit has a flaw detection part incorporating a phased array probe perform- (Continued)

ing ultrasonic phased array method, and has a pressing mechanism pressing the flaw detection part against an inner surface of the target tube.

7 Claims, 9 Drawing Sheets

(56) References Cited

FOREIGN PATENT DOCUMENTS

| | | |
|---|---|---|
| JP | 59-149055 U | 10/1984 |
| JP | 62-093658 A | 4/1987 |
| JP | 2016-191571 A | 11/2016 |

OTHER PUBLICATIONS

Decision to Grant a Patent dated May 30, 2023, issued in corresponding Japanese Patent Application No. 2019-099852 with English translation (5 pgs.).

Notice of Reasons for Refusal drafted Apr. 10, 2023, issued in corresponding Japanese Patent Application No. 2019-099852 with English translation (12 pgs.).

Second Office Action dated Jan. 25, 2024, issued in corresponding Chinese Patent Application No. 201980096205.5 with English translation (11 pgs.).

F I G. 1
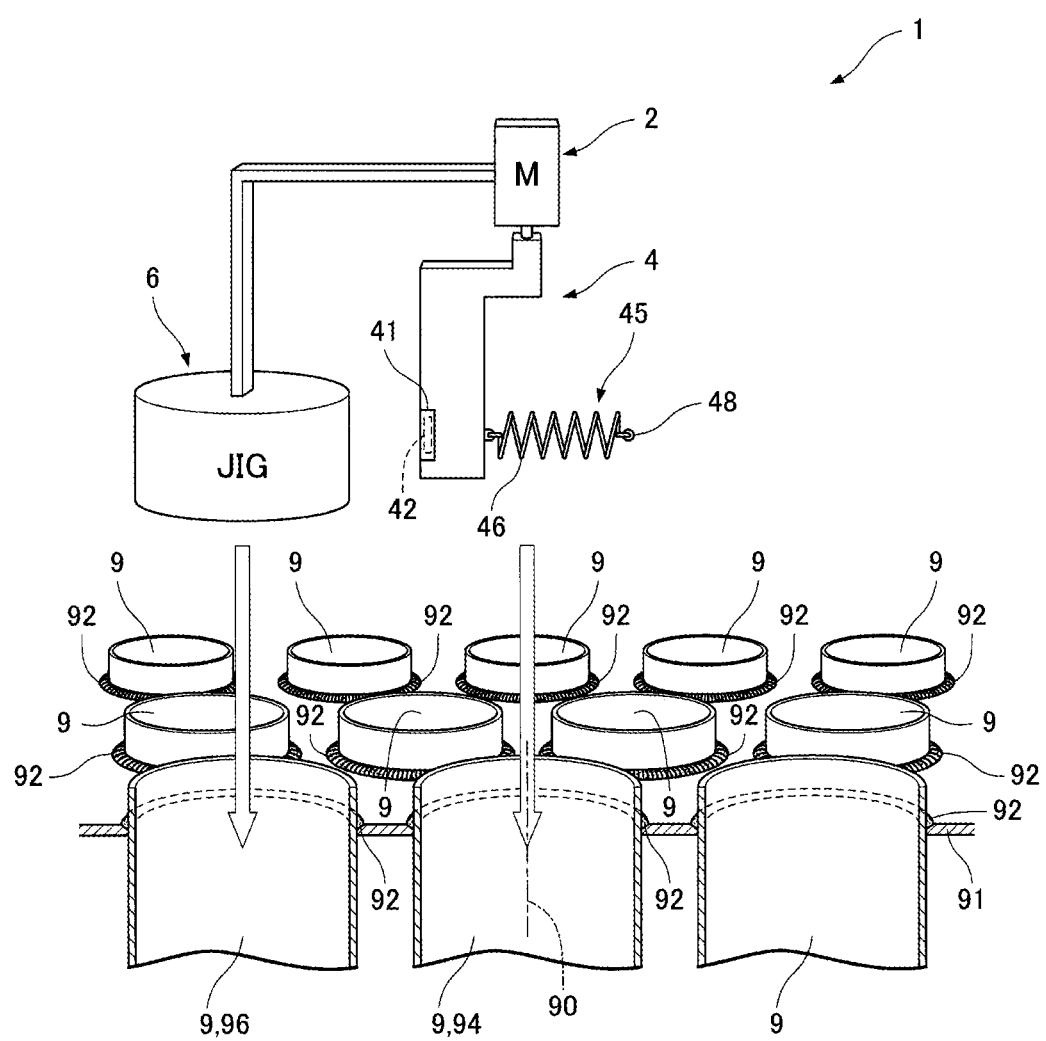

ULTRASONIC PHASED ARRAY DETECTION DEVICE FOR FLAW DETECTION OF PARALLEL TUBES

CROSS-REFERENCE TO RELATED APPLICATIONS

This application is the U.S. National Stage of PCT/JP2019/048308, filed Dec. 10, 2019, which claims priority to Japanese Patent Application No. 2019-099852, filed May 29, 2019, the entire contents of both of which are herein incorporated by reference in their entireties.

TECHNICAL FIELD

The present invention generally relates to an ultrasonic phased array detection device for performing flaw detection testing based on an ultrasonic phased array method on equipment provided with a number of tubes.

BACKGROUND ART

Heat exchangers, reactors and the like in various plants include a number of tubes arranged in parallel with each other at a fixed spacing and a tube-sheet orthogonal to the tubes, which are welded together. Since there are a large number of tubes to be inspected in such heat exchangers and reactors, it is required to inspect each and every tube rapidly and accurately.

For example, as an ultrasonic phased array detection device for welds in a number of tubes, Japanese Patent Laid-Open No. 2016-191571 (Patent Literature 1) discloses a device that facilitates adjustment and positioning of an insertion depth into a tube. In the ultrasonic phased array detection device described in Patent Literature 1, a jig to be inserted and fixed in a tube includes an expansion and contraction part that is made larger/smaller than an inside diameter of the tube. Expanding/contracting the expansion and contraction part in the tube makes it easy to fix/release the jig to the tube.

SUMMARY OF INVENTION

Technical Problem

However, the ultrasonic phased array detection device described in the above-mentioned Patent Literature 1 is a dedicated device for tubes that have such a specific inside diameter. Accordingly, the ultrasonic phased array detection device is less accurate in the flaw detection testing on a tube having the inside diameter that is out of the specific inside diameter. Even with tubes that have a specific inside diameter, the ultrasonic phased array detection device is less accurate in the flaw detection testing when the tubes have a non-uniform inside diameter due to reduction in a wall thickness caused by, for example, corrosion.

An object of the present invention is to provide an ultrasonic phased array detection device capable of performing flaw detection testing accurately even on tubes with varying inside diameters.

Solution to Problem

To solve the problem, an ultrasonic phased array detection device according to a first aspect is an ultrasonic phased array detection device for performing flaw detection testing on a welded joint sequentially for a plurality of tubes arranged in parallel with an ultrasonic phased array method, the ultrasonic phased array detection device including:
a flaw detection testing unit to be inserted into a target tube and used to perform the flaw detection testing on a welded joint of the target tube, the target tube being subjected to the flaw detection testing among the tubes;
a drive mechanism configured to rotate the flaw detection testing unit around an axis of the target tube; and
a jig to be inserted and fixed in a tube different from the target tube,
wherein the flaw detection testing unit includes:
a flaw detection part incorporating a phased array probe used to perform the ultrasonic phased array method; and
at least one pressing mechanism configured to press the flaw detection part against an inner surface of the target tube.

An ultrasonic phased array detection device according to a second aspect, wherein the ultrasonic phased array detection device according to the first aspect, more than one pressing mechanism of the flaw detection testing unit are disposed on a distal side and a proximal side of the target tube with respect to the flaw detection part.

An ultrasonic phased array detection device according to a third aspect, wherein the ultrasonic phased array detection device according to the first or second aspect, the pressing mechanism of the flaw detection testing unit includes:
a pressing motive power part capable of moving the flaw detection part toward the inner surface of the target tube by an elastic force; and
a guide member for guiding the flaw detection part to the inner surface of the target tube.

An ultrasonic phased array detection device according to a fourth aspect, wherein the ultrasonic phased array detection device according to any one of the first to third aspects, it includes an eccentricity accommodating joint connecting the drive mechanism with the flaw detection testing unit while accommodating offset between axial centers of the drive mechanism and the flaw detection testing unit.

An ultrasonic phased array detection device according to a fifth aspect, wherein the ultrasonic phased array detection device according to any one of the first to fourth aspects,
it includes a body for holding the jig and the flaw detection testing unit, and
the body includes an adjuster for adjusting depth of the flaw detection part in the target tube.

Advantageous Effects of Invention

According to the ultrasonic phased array detection device, it is possible to perform flaw detection testing accurately even when the inside diameter varies due to, for example, reduction in a wall thickness caused by corrosion on the target tube because the phased array probe and the inner surface of the target tube can be kept in contact with each other while performing the flaw detection testing.

BRIEF DESCRIPTION OF DRAWINGS

FIG. 1 is a schematic perspective view illustrating an ultrasonic phased array detection device according to Embodiment 1 of the present invention before it is fixed in a tube.

DESCRIPTION OF EMBODIMENTS

Embodiment 1

Figure 2:
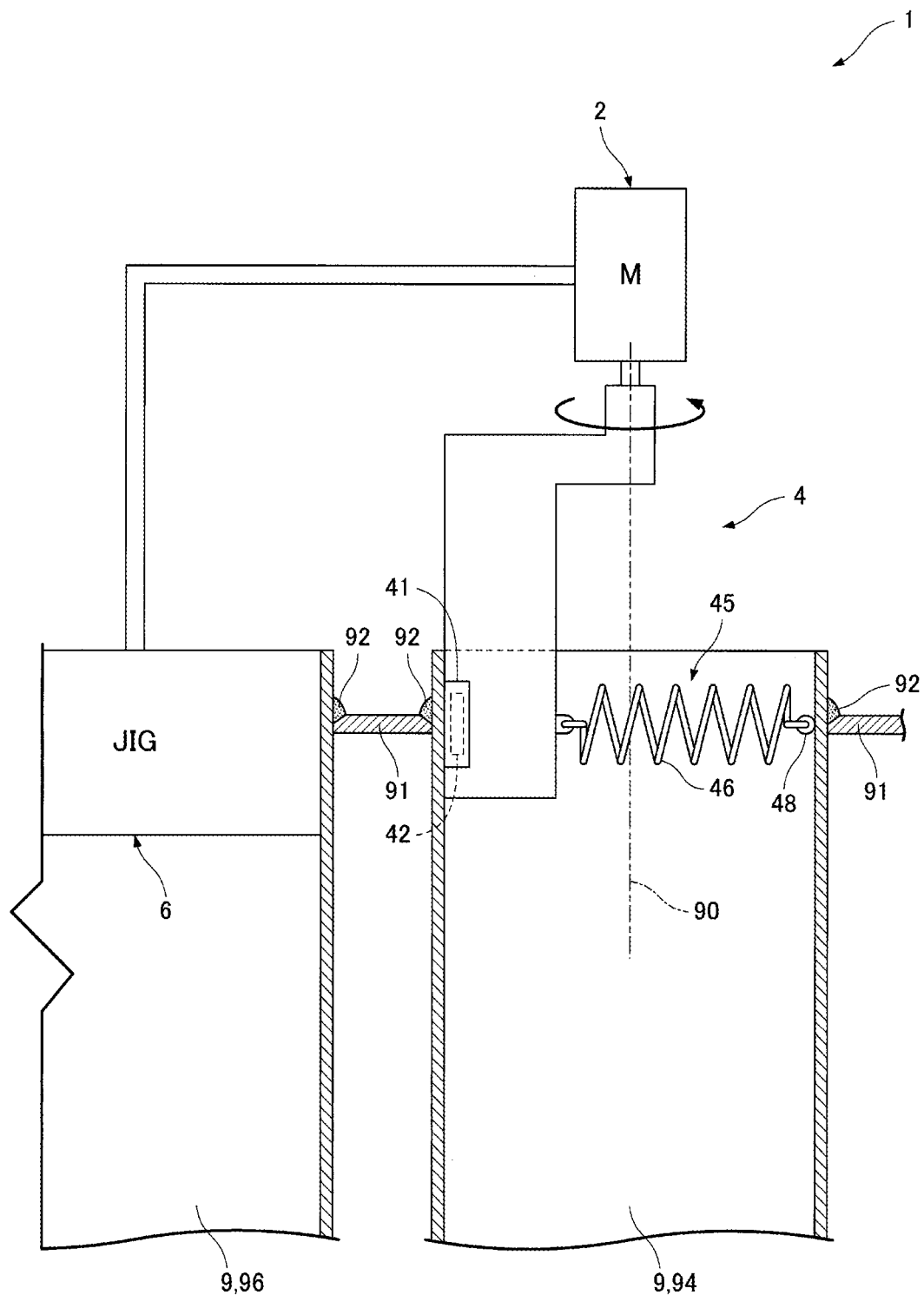
FIG. 2 is a schematic sectional view illustrating the ultrasonic phased array detection device while it is fixed in the tube.

The ultrasonic phased array detection device according to embodiments of the present invention will now be described with reference to drawings.

As illustrated in FIG. 1, for equipment including a number of tubes 9 arranged in parallel (in a row) with each other at a fixed spacing and a tube-sheet 91 orthogonal to the tubes 9, which are welded together, an ultrasonic phased array detection device 1 is an inspection device for performing flaw detection testing on welded portions (hereinafter referred to as welded joints 92) with an ultrasonic phased array method sequentially (one by one) from inside the tubes 9. Hereinafter, among a number of tubes 9 described above, a tube 94 under flaw detection testing or a tube 94 to be subjected to the flaw detection testing will be considered as a tube 94 targeted for the flaw detection testing and will be referred to as a target tube 94. When a specific tube 9 is to be subjected to flaw detection testing, the specific tube 9 is the target tube 94. However, once the flaw detection testing is completed, the specific tube 9 becomes unfit for the target tube 94, and a next tube 9 to be subjected to the flaw detection testing will be the target tube 94.

As illustrated in FIGS. 1 and 2, the ultrasonic phased array detection device 1 includes a flaw detection testing unit 4 to be inserted into the target tube 94 and used to perform flaw detection testing on the welded joint 92 of the target tube 94, a drive mechanism 2 configured to rotate the flaw detection testing unit 4 around an axis 90 of the target tube 94, and a jig 6 to be inserted and fixed in a tube 96 different from the target tube 94. The flaw detection testing unit 4 includes a flaw detection part 41 incorporating a phased array probe 42 used to perform the ultrasonic phased array method, and at least one pressing mechanism 45 configured to press the flaw detection part 41 against an inner surface of the target tube 94.

The flaw detection testing unit 4 is not necessarily inserted in its entirety into the target tube 94, but rather the flaw detection part 41 may be inserted into the target tube 94 down to at least a depth at which the flaw detection testing on the welded joint 92 can be performed from inside the target tube 94. Hereinafter, a destination side to which the flaw detection testing unit 4 is inserted and an entry side from which the flaw detection testing unit 4 is inserted in the target tube 94 are referred to as a distal side and a proximal side of the target tube 94, respectively.

Figure 3:
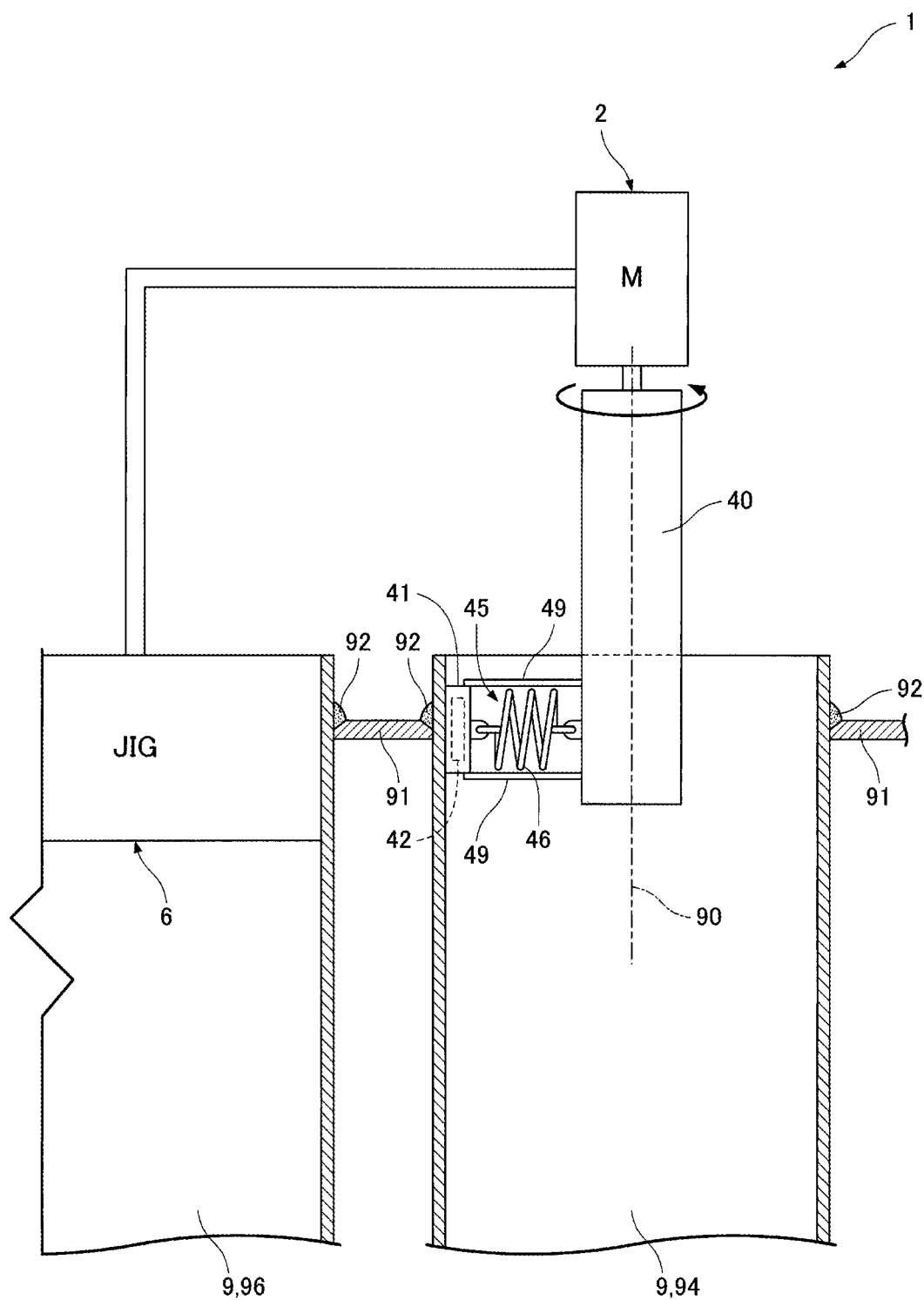
FIG. 3 is a schematic sectional view illustrating a variation of the ultrasonic phased array detection device.

The pressing mechanism 45 is not particularly limited if the flaw detection part 41 is caused to be pressed against the inner surface of the target tube 94, and is, for example, any pressing component by means of an elastic force (elastic member) such as a compression spring 46, a tension spring, or a brush, any pressing component by means of a magnetic force, or any pressing component by means of an air pressure or a hydraulic pressure. In a case in which the pressing mechanism 45 is to be brought into contact with the inner surface of the target tube 94, the pressing mechanism 45 preferably includes a roller 48 at a portion contacting the inner surface. This is because such a roller 48 reduces friction between the pressing mechanism 45 and the inner surface of the target tube 94. In addition, setting of the pressing mechanism 45 is made to such an extent that a pressing force thereof does not impede the flaw detection testing unit 4 from being rotated by the drive mechanism 2 (does not reduce rotating speed significantly). As illustrated in FIG. 3, the pressing mechanism 45 may include a pressing motive power part (for example, an elastic member such as a compression spring 46 or a brush) provided between a longitudinal member 40 and the flaw detection part 41 that constitute the flaw detection testing unit 4, and a guide member 49 for guiding the flaw detection part 41 to the inner surface of the target tube 94. Preferably, the guide member 49 guides the flaw detection part 41 to the inner surface of the target tube 94 in an orthogonal manner.

The drive mechanism 2 is not particularly limited if the flaw detection testing unit 4 is caused to rotate around the axis 90 of the target tube 94, and is, for example, a motor.

The jig 6 is not particularly limited if it is fixed in the tube 96 while it is inserted in the tube 96 different from the target tube 94, and may be, for example, a leg part including, on an outermost end thereof, an inflatable part that is inflatable and shrinkable within the tube 96, or a leg part including, on an outermost end thereof, an expansion and contraction part that can be expanded and contracted mechanically within the tube 96.

Usage of the ultrasonic phased array detection device 1 will now be described.

First, as illustrated in FIG. 1, the flaw detection testing unit 4 is inserted into the target tube 94 while the jig 6 is inserted into the tube 96 different from the target tube 94 and the jig 6 is fixed in the tube 96. Then, as illustrated in FIG. 2, the flaw detection part is pressed against the inner surface of the target tube 94 within the target tube 94 by the pressing mechanism 45.

Next, the flaw detection testing unit 4 is rotated around the axis 90 of the target tube 94 by the drive mechanism 2. While rotating, the flaw detection testing unit 4 performs the flaw detection testing with ultrasonic waves from the phased array probe 42 with the phased array method. At this time, the phased array probe 42 and the inner surface of the target tube 94 are kept in contact with each other because the flaw detection part 41 is pressed against the inner surface of the target tube 94 by the pressing mechanism 45.

In this way, according to the ultrasonic phased array detection device 1, it is possible to perform flaw detection testing accurately even when the inside diameter varies due to, for example, reduction in a wall thickness caused by corrosion on the target tube 94 because the phased array probe 42 and the inner surface of the target tube 94 are kept in contact with each other while performing the flaw detection testing.

Embodiment 2

An ultrasonic phased array detection device 1 according to Embodiment 2 capable of performing flaw detection testing more accurately than the ultrasonic phased array detection device 1 according to Embodiment 1 will now be described with reference to drawings. In Embodiment 2, configurations different from those of Embodiment 1 are focused, and the same configurations as those of Embodiment 1 will be given the same reference characters and description thereof will not be repeated.

Figure 4:
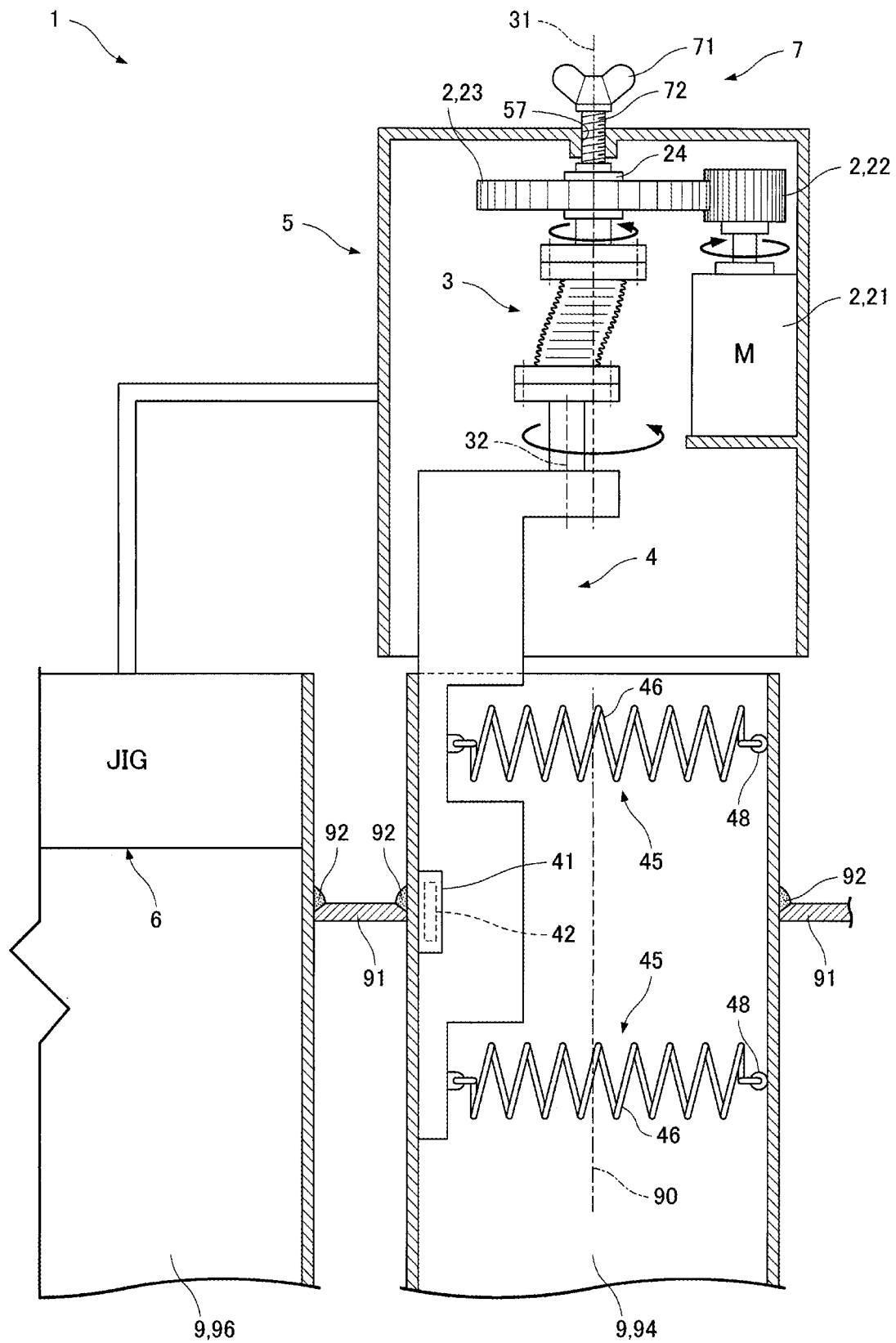
FIG. 4 is a schematic sectional view illustrating an ultrasonic phased array detection device according to Embodiment 2 of the present invention while it is fixed in a tube.

As illustrated in FIG. 4, the ultrasonic phased array detection device 1 according to Embodiment 2 includes a body 5 for holding a jig 6 and a flaw detection testing unit 4.

A drive mechanism 2 includes an electric motor 21 fixed to the body 5, a pinion 22 connected to an output shaft of the electric motor 21, and a gear 23 that meshes with the pinion 22.

The ultrasonic phased array detection device 1 includes an eccentricity accommodating joint 3 connecting the drive mechanism 2 with the flaw detection testing unit 4. The eccentricity accommodating joint 3 accommodates offset between an axial center of the drive mechanism 2 (hereinafter referred to as a driving axial center 31) and an axial center of the flaw detection testing unit 4 (hereinafter referred to as a driven axial center 32). The eccentricity accommodating joint 3 may be one that transfers rotation of the drive mechanism 2 around the driving axial center 31 into rotation of the flaw detection testing unit 4 around the driven axial center 32 (transfers into rotation), or may be one that transfers rotation of the drive mechanism 2 around the driving axial center 31 into rotation of the flaw detection testing unit 4 around the driving axial center 31 (transfers into revolution).

The body 5 includes an adjuster 7 for adjusting depth of a flaw detection part 41 in a target tube 94. The adjuster 7 is a bolt 72 provided with a tab 71 on one end, and threaded into an internally threaded hole 57 formed in the body 5 along the driving axial center 31, the one end being located outside the body 5 and the other side being connected to the gear 23 within the body 5 with a bearing 24 or the like in between.

Figure 5:
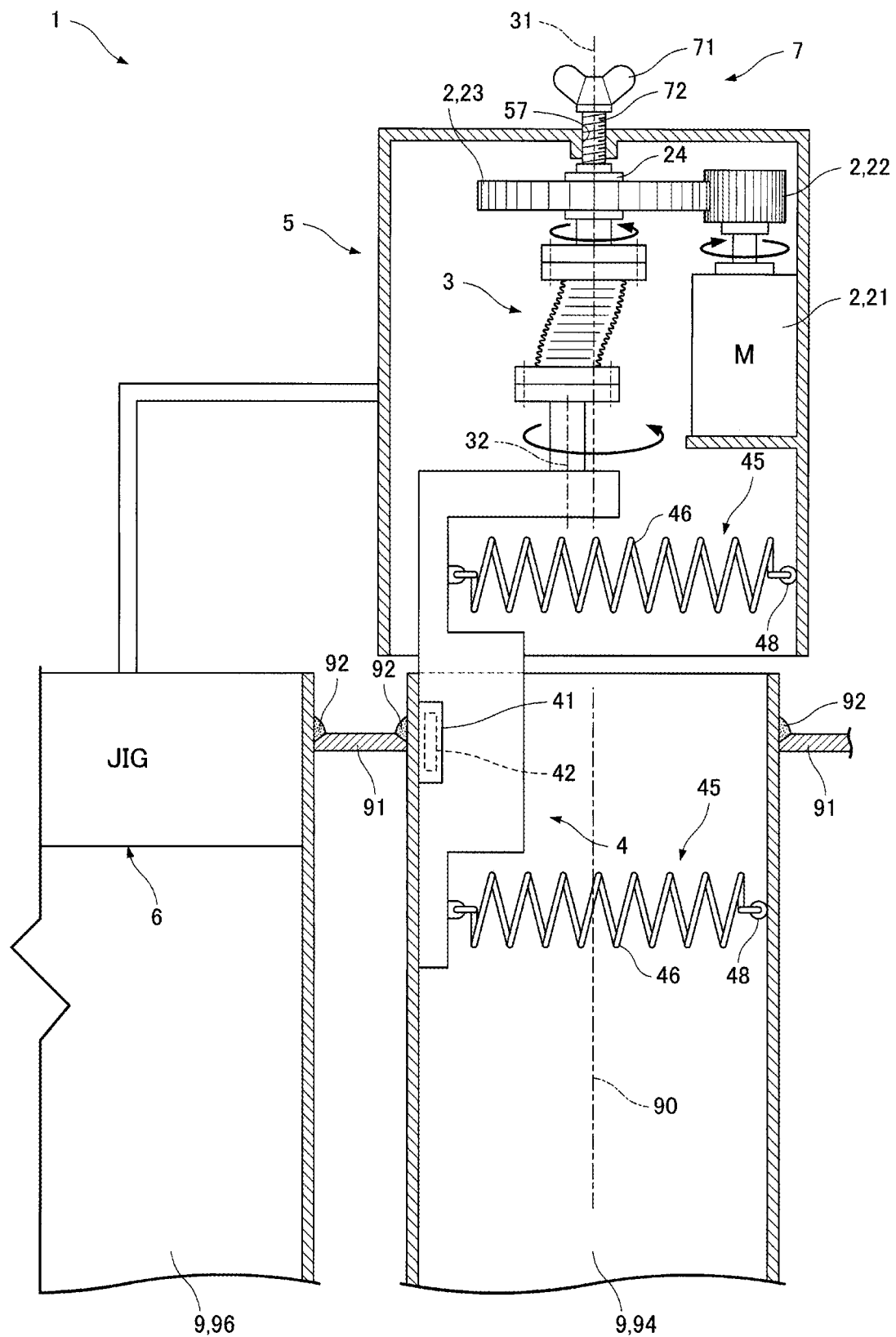
FIG. 5 is a schematic sectional view illustrating a variation of the ultrasonic phased array detection device.

For example, there are more than one pressing mechanism 45 of the flaw detection testing unit 4; FIG. 4 illustrates a case of two pressing mechanisms. One of the pressing mechanisms 45 is disposed on the distal side of the target tube 94 and the other is disposed on the proximal side of the target tube 94. In other words, the pressing mechanisms 45 are disposed on the distal and proximal sides of the target tube 94 with respect to the flaw detection part 41. The one of the pressing mechanisms 45 disposed on the proximal side of the target tube 94 may be located within the target tube 94 as illustrated in FIG. 4 or may be located within the body 5 as illustrated in FIG. 5. The configuration illustrated in FIG. 4 is suitable for flaw detection testing when the welded joint 92 is located further on the distal side of the target tube 94, and the configuration illustrated in FIG. 5 is suitable for flaw detection testing when the welded joint 92 is located further on the proximal side of the target tube 94.

Usage of the ultrasonic phased array detection device 1 will now be described.

First, as illustrated in FIGS. 4 and 5, the flaw detection testing unit 4 is inserted into the target tube 94 while the jig 6 is inserted into a tube 96 different from the target tube 94 and the jig 6 is fixed in the tube 96. Then, the flaw detection part 41 is pressed against an inner surface of the target tube 94 within the target tube 94 by the pressing mechanisms 45. The pressing is achieved from both the distal and proximal sides of the target tube 94 with respect to the flaw detection part 41, providing higher stability than Embodiment 1.

After the jig 6 is fixed in the tube 96 different from the target tube 94, it may in some cases be found that the depth of the flaw detection part 41 in the target tube 94 is not appropriate. In this case, turning the tab 71 of the adjuster 7 allows adjustment of the depth.

Next, the flaw detection testing unit 4 is rotated around an axis 90 of the target tube 94 by the drive mechanism 2. At this time, depending on the inside diameter of the target tube 94, it is necessary to offset the driving axial center 31, which is the axial center of the drive mechanism 2, and the driven axial center 32, which is the axial center of the flaw detection testing unit 4. However, the offset is accommodated by the eccentricity accommodating joint 3, so that rotation is appropriately transferred from the drive mechanism 2 to the flaw detection testing unit 4. Then, while rotating, the flaw detection testing unit 4 performs the flaw detection testing with ultrasonic waves from a phased array probe 42 with a phased array method. At this time, the phased array probe 42 and the inner surface of the target tube 94 are kept in contact with each other because the flaw detection part 41 is pressed against the inner surface of the target tube 94 by the pressing mechanisms 45.

In this way, according to the ultrasonic phased array detection device 1, it is possible to perform flaw detection testing more accurately even when the inside diameter varies due to, for example, reduction in a wall thickness caused by corrosion on the target tube 94 because the phased array probe 42 and the inner surface of the target tube 94 are stably kept in contact with each other while performing the flaw detection testing.

Additionally, since the offset between the axial centers 31 and 32 of the drive mechanism 2 and the flaw detection testing unit 4 is accommodated by the eccentricity accommodating joint 3, the flaw detection testing unit 4 rotates appropriately with respect to the target tube 94. As a result, it is possible to perform flaw detection testing more accurately.

Further, the depth of the flaw detection part 41 in the target tube 94 is adjusted by the adjuster 7, positional relationship between the welded joint 92 of the target tube 94 and the flaw detection part 41 is made more appropriate. As a result, it is possible to perform flaw detection testing more accurately.

EXAMPLE

An ultrasonic phased array detection device 1 according to Example, which illustrates Embodiments 1 and 2 more specifically, will now be described with reference to FIGS. 6 to 9. In Example, configurations different from those of Embodiments 1 and 2 are focused, and the same configurations as those of the embodiments will be given the same reference characters and description thereof will not be repeated.

Figure 6:
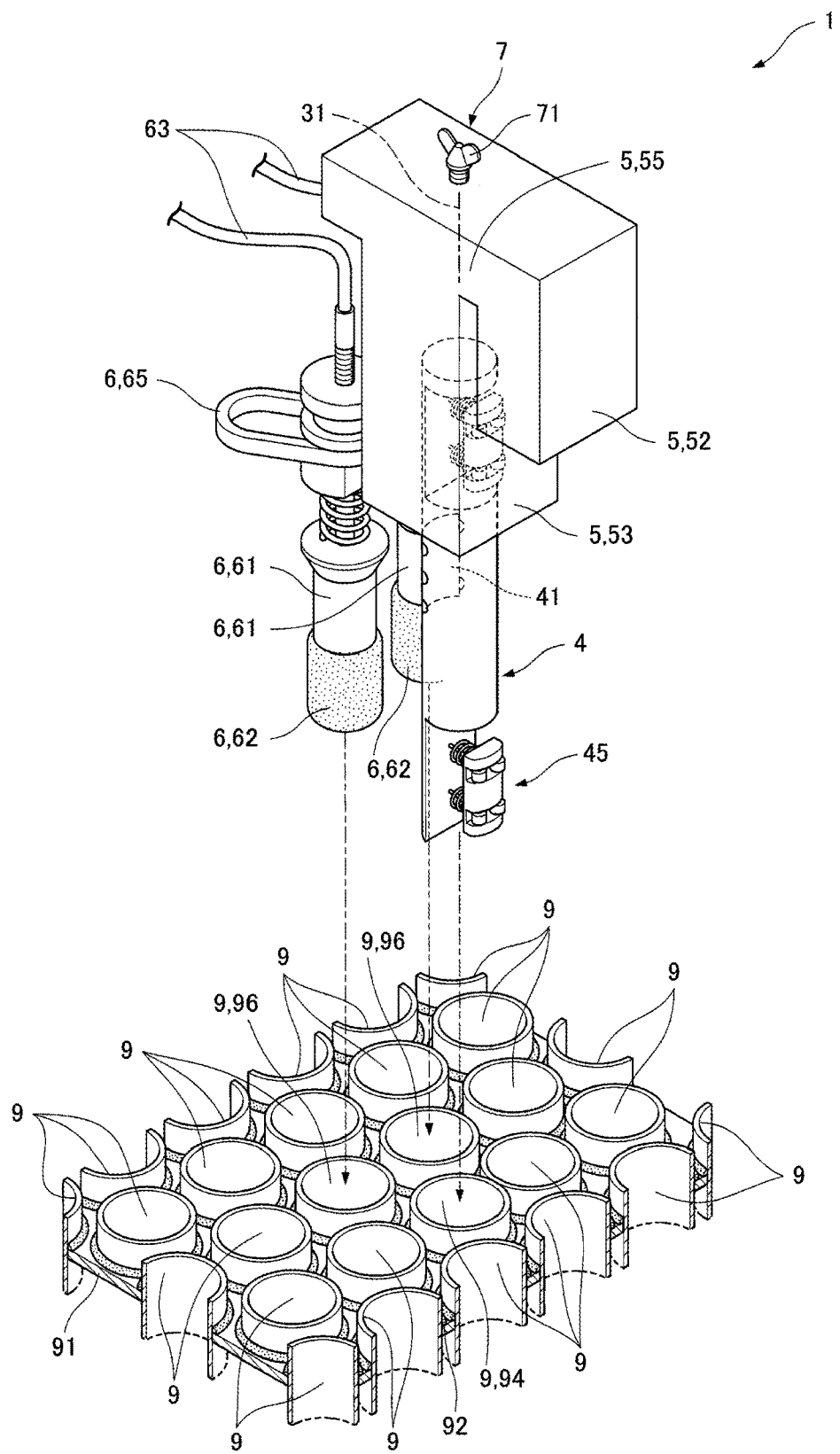
FIG. 6 is a perspective view illustrating an ultrasonic phased array detection device according to Example of the present invention before it is fixed in a tube.
Figure 7:
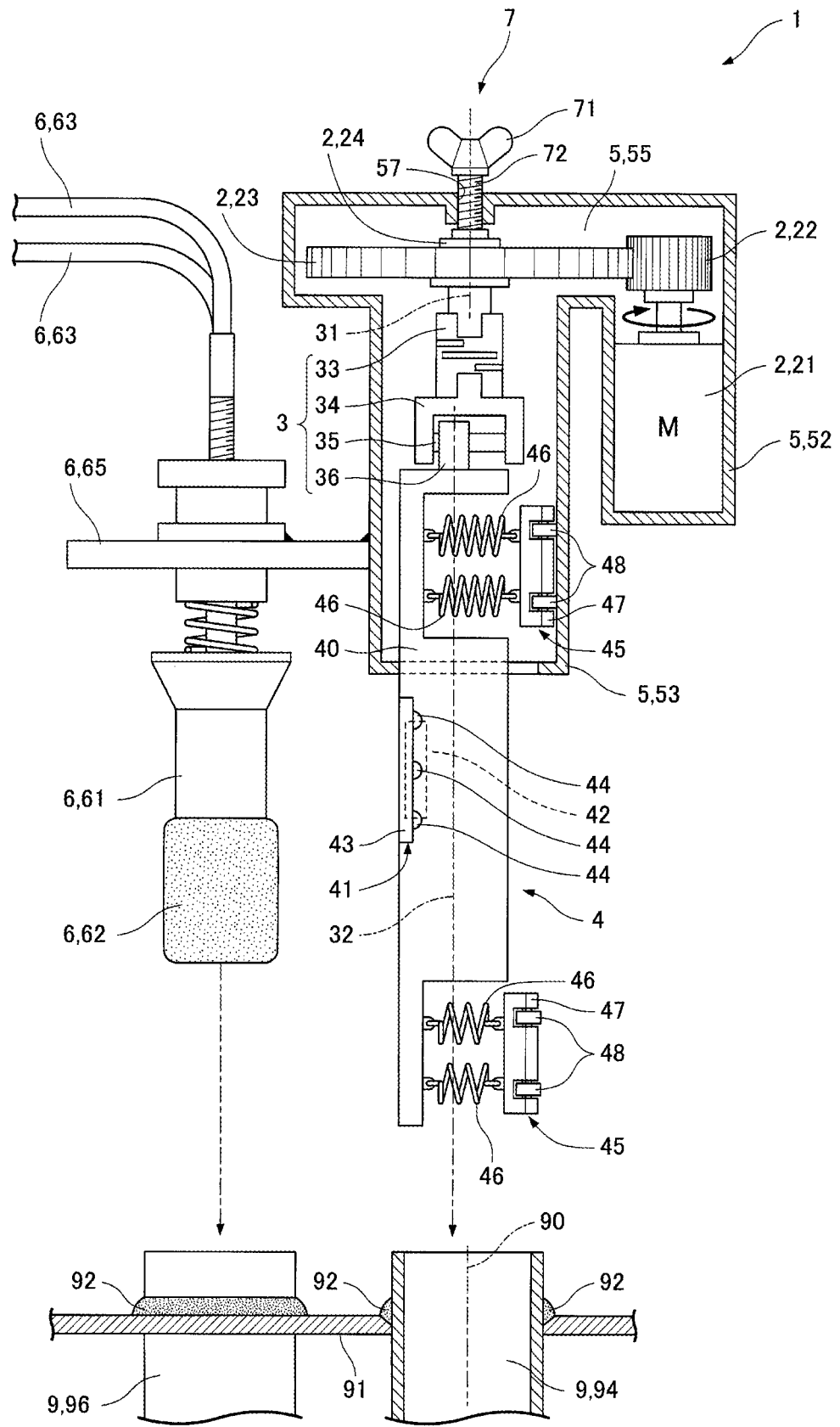
FIG. 7 is a sectional view illustrating the ultrasonic phased array detection device before it is fixed in the tube.

As illustrated in FIGS. 6 and 7, a body 5 of the ultrasonic phased array detection device 1 according to Example has a bifurcated shape with two generally cuboids and 53 connected at outermost ends thereof. Hereinafter, one of the two generally cuboids 52 and 53 that has a protruded flaw detection testing unit 4 will be referred to as a testing unit-side cuboid 53, the other cuboid will be referred to as a motor-side cuboid 52, and a portion that connects the testing unit-side cuboid 53 with the motor-side cuboid 52 at outermost ends thereof will be referred to as a connecting part 55.

Figure 8:
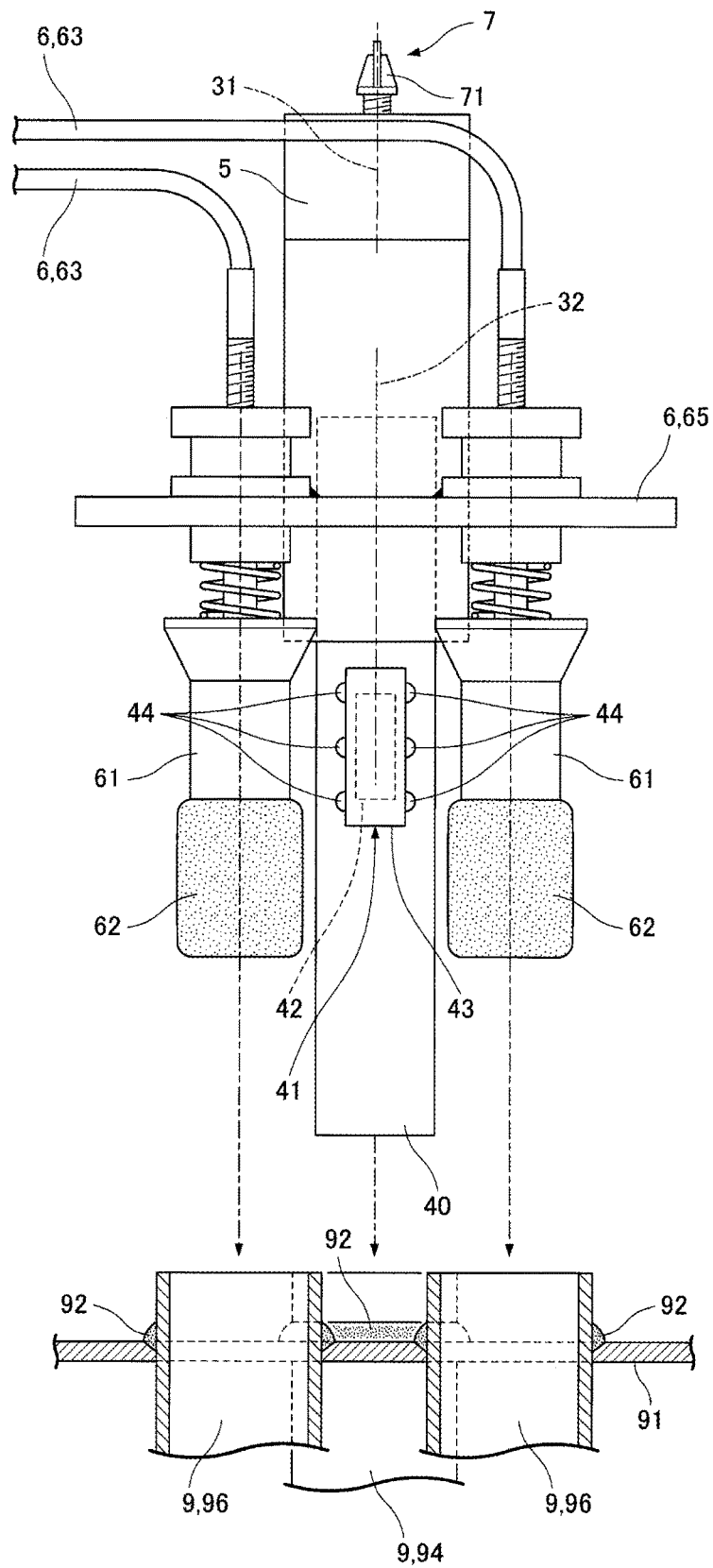
FIG. 8 is a front view illustrating the ultrasonic phased array detection device before it is fixed in the tube.

As illustrated in FIGS. 6 and 8, a jig 6 of the ultrasonic phased array detection device 1 according to Example includes an elongated hole holding member 65 attached to the testing unit-side cuboid 53 in an orientation orthogonal to a driving axial center 31, two leg parts 61 that are arranged in parallel to the flaw detection testing unit 4 and fixed at any position in the elongated hole holding member 65, an inflatable part 62 that is provided to each of the two leg parts 61 at the outermost ends thereof and is inflatable and shrinkable, and an air tube 63 that supplies and discharges air for inflating and shrinking the inflatable part 62. The leg parts 61 are each adjustable in length thereof and can be fastened at any position in an elongated hole formed in the elongated hole holding member 65. When inserted in each of two tubes 96 adjacent to a target tube 94, each of the leg parts 61 is fixed to the elongated hole holding member 65 at a position where the flaw detection testing unit 4 is inserted into the target tube 94.

Figure 9:
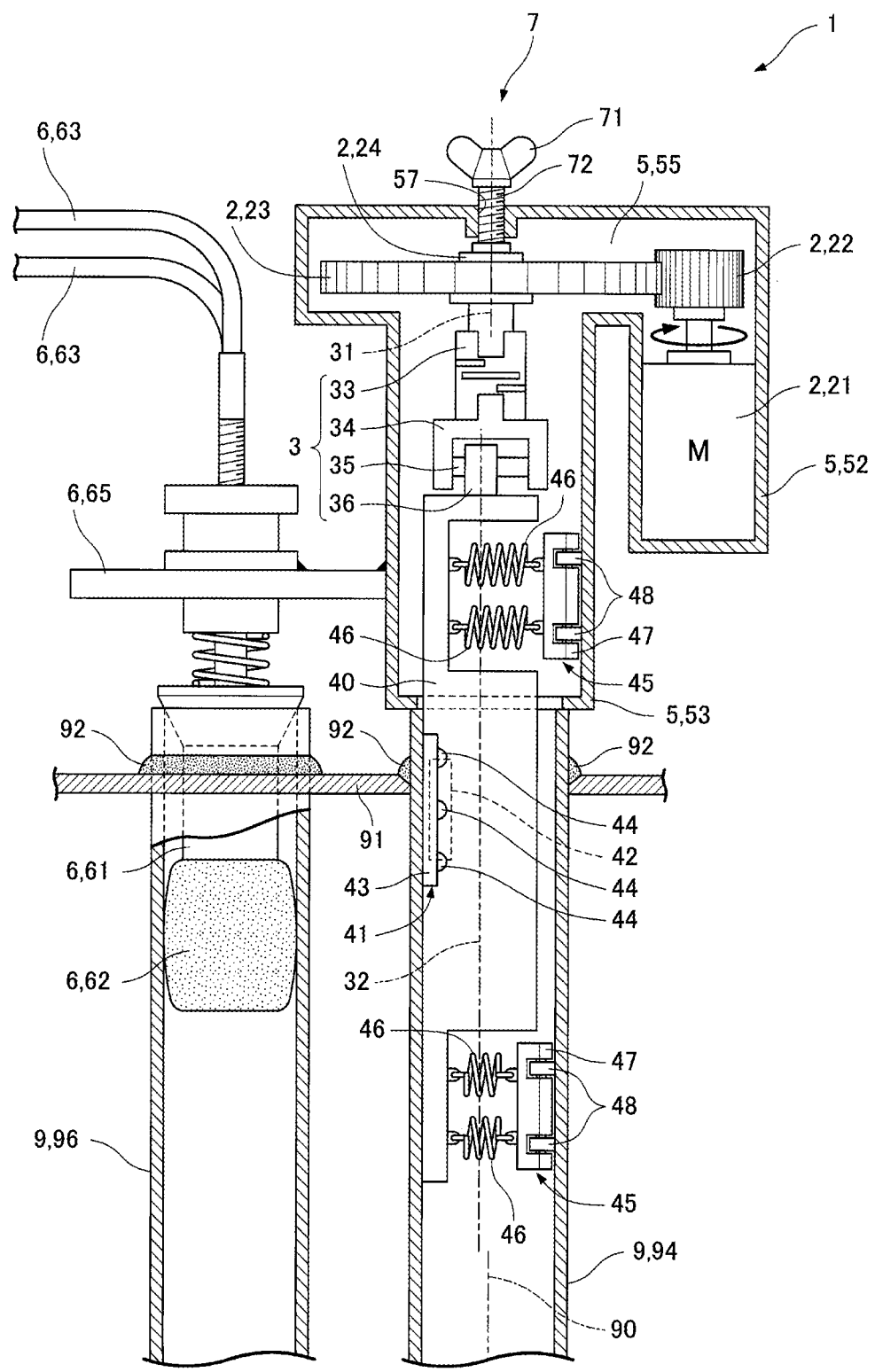
FIG. 9 is a sectional view illustrating the ultrasonic phased array detection device while it is fixed in the tube.

Next, description will be made as to a state in which the jig 6 of the ultrasonic phased array detection device 1 is inserted and fixed in the tubes 96 adjacent to the target tube 94 with reference to FIG. 9.

An electric motor 21 is contained in the motor-side cuboid 52 and fixed to the motor-side cuboid 52. A pinion 22, which is connected to an output shaft of the electric motor 21, is contained in an outermost end portion of the motor-side cuboid 52. A gear 23 that meshes with the pinion 22 is contained through the connecting part 55 and an outermost end portion of the testing unit-side cuboid 53. A bearing 24 for the gear 23 is contained in the outermost end portion of the testing unit-side cuboid 53 and can be moved along the driving axial center 31 by an adjuster 7. An internally threaded hole 57 into which a bolt 72 of the adjuster 7 is threaded is formed on an extension of the driving axial center 31 in the testing unit-side cuboid 53.

An eccentricity accommodating joint 3 connected to the gear 23 is contained in the testing unit-side cuboid and includes members 33 to 36 as described below. Specifically, the eccentricity accommodating joint 3 includes a flexible coupling 33 to which a shaft of the gear 23 is connected on a driving side, a driven member 34 connected to the flexible coupling 33 on a driven side, a guide pin 35 that is attached to the driven member 34 and is orthogonal to the driving axial center 31, and a sliding member 36 that slides along the guide pin 35. The flexible coupling 33 transfers rotation of the gear 23 around the driving axial center 31 into rotation and the driven member 34, the guide pin 35, and the sliding member 36 transfers the rotation of the gear 23 around the driving axial center 31 into revolution.

The flaw detection testing unit 4 includes a longitudinal member 40 along a driven axial center 32, pressing mechanisms 45 that press the longitudinal member 40 in a direction parallel to the guide pin 35, and a flaw detection part 41 provided on the longitudinal member 40. The longitudinal member 40 is attached to the sliding member 36 on one end within the testing unit-side cuboid 53, and a center portion and the other end protrude from the testing unit-side cuboid 53. The pressing mechanisms 45 are disposed inside and outside the testing unit-side cuboid 53, respectively. Each pressing mechanism 45 includes compression springs 46 connected to the longitudinal member 40 on one end and a roller member 47 connected to the other end of the compression springs 46. The roller member 47 includes rollers 48 that rotates around an axial center parallel to the driven axial center 32. The flaw detection part 41 includes a phased array probe 42 disposed near a surface of the longitudinal member 40, a wedge 43 that covers the phased array probe 42 and is allowed to face an inner surface of the target tube 94, and media supplying holes from which contact media required for flaw detection testing can be supplied from around the wedge 43.

Usage of the ultrasonic phased array detection device 1 will now be described.

First, as illustrated in FIG. 6, the flaw detection testing unit 4 is inserted into the target tube 94 while the shrunk inflatable parts 62 of the jig 6 are inserted into the tubes 96 adjacent to the target tube 94. Next, as illustrated in FIG. 9, the inflatable parts 62 are caused to inflate within the tubes 96 to fix the jig 6 in the tubes 96. Then, the flaw detection part 41 is pressed against the inner surface of the target tube 94 within the target tube 94 by the pressing mechanisms 45.

After the jig 6 is fixed in the tubes 96 adjacent to the target tube 94, it may in some cases be found that the depth of the flaw detection part 41 in the target tube 94 is not appropriate. For example, it is often the case that a monitor (not illustrated) electrically connected to the flaw detection part 41 is used to verify a status of the flaw detection testing. In this case, turning a tab 71 of the adjuster 7 allows adjustment of the depth.

Next, the flaw detection testing unit 4 is rotated around an axis 90 of the target tube 94 by a drive mechanism 2. At this time, depending on the inside diameter of the target tube 94, it is necessary to offset the driving axial center 31, which is an axial center of the drive mechanism 2, and the driven axial center 32, which is an axial center of the flaw detection testing unit 4. However, the offset is accommodated by the eccentricity accommodating joint 3, so that rotation is appropriately transferred from the drive mechanism 2 to the flaw detection testing unit 4. In particular, since the eccentricity accommodating joint 3 transfers rotation of the drive mechanism 2 into rotation and revolution, the rotation is transferred appropriately from the drive mechanism 2 to the flaw detection testing unit 4 even when the offset is large. Then, while rotating, the flaw detection testing unit 4 performs the flaw detection testing with ultrasonic waves from the phased array probe 42 with the phased array method. At this time, the phased array probe 42 and the inner surface of the target tube 94 are kept in contact with each other because the flaw detection part 41 is pressed against the inner surface of the target tube 94 by the pressing mechanisms 45. A spacing of several to several hundreds of micrometres is created between the inner surface of the target tube 94 and the wedge 43; the spacing is to be filled with contact media supplied from the media supplying holes 44 by capillary action. Then, the flaw detection testing is achieved more appropriately.

In this way, according to the ultrasonic phased array detection device 1, advantageous effects described below are produced in addition to effects produced in Embodiments 1 and 2. Specifically, since the offset between the axial centers 31 and 32 is accommodated more appropriately by the eccentricity accommodating joint 3 that transfers rotation of the drive mechanism 2 into rotation and revolution, the flaw detection testing unit rotates more appropriately with respect to the target tube 94. As a result, it is possible to perform flaw detection testing far more accurately.

In Embodiments 1 and 2 and Example, although the equipment in which the tubes 9 protrude from the tube-sheet 91 on the proximal side is illustrated for the detention testing, an equipment in which the tubes 9 do not protrude from the tube-sheet 91 on the proximal side may be used for the detention testing.

Further, in Embodiment 2 and Example, the same pressing mechanisms 45 are illustrated as being disposed on the distal and proximal sides of the target tube 94 with respect to the flaw detection part 41, the pressing mechanisms 45 may be different from each other. Preferably, the pressing mechanisms 45 press the flaw detection part 41 against the inner surface of the target tube 94 uniformly in a depth direction. This is because when the flaw detection part 41 is pressed uniformly in the depth direction, it is possible to perform flaw detection testing far more accurately. In a case in which the pressing mechanism 45 is disposed within the testing unit-side cuboid 53, even when the elastic member of the pressing mechanism 45 is a tension spring, the flaw detection part 41 is pulled toward the inner surface of the target tube 94 by the tension spring via the longitudinal member 40, so that the flaw detection part 41 can be pressed against the inner surface of the target tube 94.

In Embodiments 1 and 2 and Example, although description has been made as to a case in which the number of pressing mechanisms 45 is 1 or 2, it may be 3 or more. In a case in which the pressing mechanism 45 can be reduced in size, it is preferable that the pressing mechanism 45 does not press the inner surface of the target tube 94 as illustrated in FIG. 3. The pressing motive power part illustrated as being the compression spring 46 in FIG. 3 may not be limited to an elastic member such as the compression spring 46 if the flaw detection part 41 can be moved toward the inner surface of the target tube 94 in any way.

Embodiments 1 and 2 and Example described above are illustrative only in all respects and are not limitation. The scope of the present invention is to be defined not by the above description but by claims, and is intended to encompass all modifications within the sense and scope equivalent to claims. Except the configuration described as the first aspect in "Solution to Problem", any other configurations described in Embodiments 1 and 2 and Example are optional and may be omitted or changed as appropriate.

The invention claimed is:

1. An ultrasonic phased array detection device for performing flaw detection testing on a welded joint sequentially for a plurality of tubes arranged in a row with an ultrasonic phased array method, the ultrasonic phased array detection device comprising:
   a flaw detection testing unit to be inserted into a target tube and used to perform flaw detection testing on a welded joint of the target tube, the target tube being subjected to the flaw detection testing among the tubes;
   a drive mechanism configured to rotate the flaw detection testing unit around an axis of the target tube; and
   a jig to be inserted and fixed in a tube different from the target tube,
   wherein an axial center of the flaw detection testing unit is configured to be inclined with respect to an axial center of the drive mechanism,
   wherein the flaw detection testing unit includes:
      a flaw detection part incorporating a phased array probe used to perform the ultrasonic phased array method; and
      at least one pressing mechanism configured to press the flaw detection part against an inner surface of the target tube, and
   wherein the at least one pressing mechanism of the flaw detection testing unit is disposed on a distal side and a proximal side of the target tube with respect to the flaw detection part.

2. The ultrasonic phased array detection device according to claim 1, wherein the pressing mechanism of the flaw detection testing unit includes:
   a pressing motive power part configured to move the flaw detection part toward the inner surface of the target tube by an elastic force; and
   a guide member configured to guide the flaw detection part to the inner surface of the target tube.

3. The ultrasonic phased array detection device according to claim 1, comprising an eccentricity accommodating joint connecting the drive mechanism with the flaw detection testing unit while accommodating offset between axial centers of the drive mechanism and the flaw detection testing unit.

4. The ultrasonic phased array detection device according to claim 1, comprising a body configured to hold the jig and the flaw detection testing unit,
   wherein the body includes an adjuster configured to adjust depth of the flaw detection part in the target tube.

5. The ultrasonic phased array detection device according to claim 1, wherein the pressing mechanism of the flaw detection testing unit includes:
   a pressing motive power part configured to move the flaw detection part toward the inner surface of the target tube by an elastic force; and a guide member configured to guide the flaw detection part to the inner surface of the target tube.

6. The ultrasonic phased array detection device according to claim 1, comprising an eccentricity accommodating joint connecting the drive mechanism with the flaw detection testing unit while accommodating offset between axial centers of the drive mechanism and the flaw detection testing unit.

7. The ultrasonic phased array detection device according to claim 1, comprising a body configured to hold the jig and the flaw detection testing unit,
   wherein the body includes an adjuster configured to adjust depth of the flaw detection part in the target tube.

* * * * *